US007027359B2

(12) United States Patent
Apothéloz et al.

(10) Patent No.: US 7,027,359 B2
(45) Date of Patent: Apr. 11, 2006

(54) WATCH INCLUDING IN THE BACK OF ITS CASE AN ELECTRONIC MODULE FOR STORING INFORMATION

(75) Inventors: David Apothéloz, Corcelles (CH); Jacques Müller, Reconvilier (CH); Clément Meyrat, Le Landeron (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 10/527,151

(22) PCT Filed: Sep. 4, 2003

(86) PCT No.: PCT/EP03/09804

§ 371 (c)(1),
(2), (4) Date: Mar. 9, 2005

(87) PCT Pub. No.: WO2004/025381

PCT Pub. Date: Mar. 25, 2004

(65) Prior Publication Data

US 2005/0249050 A1 Nov. 10, 2005

(30) Foreign Application Priority Data

Sep. 10, 2002 (EP) .................................. 02078737

(51) Int. Cl.
*G04B 47/00* (2006.01)
*G04B 37/00* (2006.01)
*G04B 1/06* (2006.01)
*G06K 19/00* (2006.01)
*H01Q 1/12* (2006.01)

(52) U.S. Cl. ........................... 368/10; 368/47; 368/88; 368/281; 368/309; 235/487; 343/718; 455/344; 455/347

(58) Field of Classification Search .................. 368/10, 368/11, 47, 88, 278, 281, 309; 343/718, 343/720; 235/487, 492; 455/90.3, 344, 455/347

See application file for complete search history.

(56) References Cited

U.S. PATENT DOCUMENTS 5,798,984 A * 8/1998 Koch .......................... 368/10

(Continued)

FOREIGN PATENT DOCUMENTS

CH 691094 A 4/2001

(Continued)

OTHER PUBLICATIONS

International Search Report, completed Jun. 9, 2004.

*Primary Examiner*—Vit W. Miska
(74) *Attorney, Agent, or Firm*—Griffin & Szipl. P.C.

(57) ABSTRACT

The invention relates to watches, generally wristwatches, whose cases incorporate electronic modules for storing information that comprise an integrated circuit connected to an antenna consisting of a coil and are able to communicate by radio signals with a reading and/or writing device adapted at least to read the information contained in a memory of the integrated circuit and often also adapted to delete or modify at least some of that information and to add other information.

To eliminate the drawbacks of prior art watches in which the module is inside the case (complicated fabrication or new design of the watch, increased volume thereof) or to reduce the importance of those drawbacks (attenuation and/or distortion of the signals sent and received by the coil), in the watch of the invention the electronic module (14) is housed at least for the most part in a cavity (13) in the back (3) of the case (1) open towards the outside.

8 Claims, 4 Drawing Sheets

U.S. PATENT DOCUMENTS

| | | | | |
|---|---|---|---|---|
| 6,164,815 | A * | 12/2000 | Degonda | 368/278 |
| 6,484,947 | B1 | 11/2002 | Miyata | |
| 6,724,690 | B1 * | 4/2004 | Endo et al. | 368/10 |
| 6,853,605 | B1 * | 2/2005 | Fujisawa et al. | 368/10 |
| 6,854,978 | B1 * | 2/2005 | Noirjean | 439/37 |

FOREIGN PATENT DOCUMENTS

| | | | |
|---|---|---|---|
| DE | 19946254 | A1 | 4/2001 |
| EP | 0376062 | A1 | 7/1990 |
| EP | 0647943 | A1 | 4/1995 |
| EP | 0884662 | A2 | 12/1998 |
| EP | 1288016 | A1 | 3/2003 |
| JP | 2000-339503 | A | 12/2000 |
| WO | WO 94/18700 | | 8/1994 |
| WO | WO 02/23466 | A1 | 3/2002 |
| WO | WO 02/055315 | A1 | 7/2002 |

* cited by examiner

WATCH INCLUDING IN THE BACK OF ITS CASE AN ELECTRONIC MODULE FOR STORING INFORMATION

This is a National Phase Application in the United States of International Patent Application No. PCT/EP03/09804 filed Sep. 4, 2003, which claims priority on European Patent Application No. 02078737.0, filed Sep. 10, 2002. The entire disclosures of the above patent applications are hereby incorporated by reference.

The present invention relates to watches, generally wristwatches, whose cases incorporate electronic modules for storing information that comprise an integrated circuit or chip connected to an antenna consisting of a coil and are able to communicate by radio signals with a reading and/or writing device adapted at least to read the information contained in a memory of the integrated circuit and often also adapted to delete or modify at least some of that information and to add other information.

To be more precise, the invention relates to watches in which the electronic modules are passive, meaning that these modules do not need their own power supply, such as batteries or rechargeable batteries, to be able to operate, being supplied with power by the radio signals from the reading and/or writing device with which they co-operate.

Some watches of the above kind merely store an access code to private or protected premises or to ski slopes, for example. Others include electronic modules equipped with more complicated integrated circuits and may contain the medical records of their owner.

In some prior art watches, the electronic module is placed in a hollow and preferably removable bezel so that the module can be changed if necessary. This solution may therefore not be suitable for watches having any type of case. Moreover, if the case actually includes a bezel or a case-bezel, this complicates its fabrication and consequently increases the unit cost of the watch.

The document JP 2000-339503 describes a watch of the above kind that comprises an electronic module mounted on the outside of the watch glass. One drawback of placing said module on the glass is that it cannot be protected from mechanical shock when the user is wearing the watch. Also, as it is in front of the watch dial, it is always visible, which degrades the aesthetics of the watch.

In other watches the module is placed in a space between the rear of the movement of the watch and the back of the case, which necessarily increases their volume. If the back of the case is made from a material that is not really amagnetic, such as steel, the magnetic flux emitted or received by the coil of the electronic module suffers high losses, and even if measures are taken to limit these losses, they are far from negligible. Finally, even if the back of the case is made from an amagnetic material, for example a plastic material, radio signals emitted and received by the coil of the module, which have to pass through the whole of the thickness of the back, suffer high attenuation.

The object of the invention is to provide a watch, in particular a wristwatch, that completely eliminates or at least reduces the drawbacks of the above prior art watches.

To achieve the above object, the watch has the features set out in claim 1.

Advantageous embodiments of the watch are defined in the dependent claims 2 to 8.

The cavity and the module preferably have an essentially cylindrical shape and are preferably situated at the centre of the back of the case.

Accordingly, unlike a watch in which the module is placed at the back of the case and entirely within it, in the watch of the invention signals emitted and received by the coil of the module have to pass only through the base of the module, which is much thinner than the back of the case.

It is possible to obtain a watch of the invention starting with an existing watch by forming in its back a blind hole with a shape adapted to that of the electronic module.

If the back of the case is removable, it is possible to replace it to convert an ordinary watch into a watch of the invention.

This being so, in one embodiment of the watch of the invention, the base of the module is cup-shaped and has a flat bottom to which the coil and the integrated circuit are fixed and a lateral wall around the coil.

This embodiment is particularly suitable if the back of the case is made from a magnetic material such as steel.

The invention will be better understood after reading the following description, which is given by way of example and with reference to the appended drawings, of several embodiments of the invention, in which drawings.

Although the invention is obviously not limited to this application, the following description applies to the situation in which the electronic module fitted to the watch is designed to store information that relates to the watch itself and to be placed at a very small distance (a few millimeters at the most) from the coil that constitutes the send and receive antenna of a reading and/or writing device with which it is able to communicate.

Figure 1:
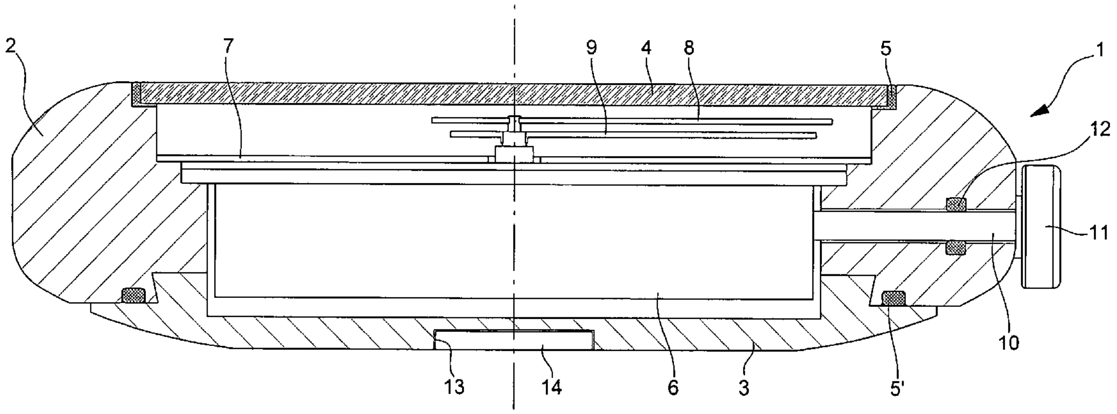
FIG. 1 is a diagrammatic view in diametral section of an analogue display wristwatch of the invention.

The wristwatch shown diagrammatically in FIG. 1 comprises a case 1 that consists of a metal case-bezel unit 2, a metal back 3 and a glass 4 clamped to the case-bezel unit 2 in the conventional way by means of a gasket 5 which also seals the glass to the case.

FIG. 1 shows the back 3 clipped to the case-bezel unit 2, but the back could equally well be screwed to it or fixed to it by means of a bayonet system in such a manner as to compress a gasket 5' that seals the back to the case.

The case 1 finally comprises a wrist-band attachment system that is not visible in FIG. 1 and may comprise two pairs of horns on the case-bezel unit 2.

The case 1 houses a movement 6 which drives a minute hand 8 and an hour hand 9 placed in front of a dial 7 and which comprises a control spindle 10 that passes through the case-bezel unit 2 and terminates in a crown 11, an O-ring 12 sealing the case 1 where the spindle passes through the case-bezel. If the watch is not of the electromechanical or self-winding type, the spindle 10 and the crown 11 are also used to wind the watch.

In accordance with the invention, the back 3 of the case 1 has a cavity 13 that is open towards the exterior of the case and houses an electronic module 14, the cavity and the module preferably being essentially cylindrical and situated at the centre of the back 3.

Given that, in the application envisaged here, the electronic module 14 has a much smaller area than the back of the case and the module can be made in various shapes, it is merely represented in FIG. 1 by a rectangle.

Figure 2:
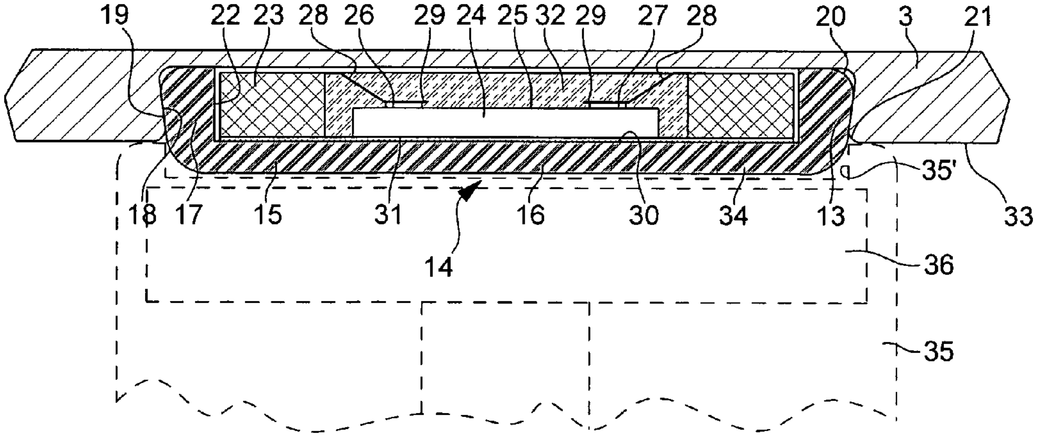
FIG. 2 is a view in diametral section to a larger scale of the portion of the back of the FIG. 1 case which accommodates a first embodiment of an electronic module incorporated into the back.

FIG. 2 is a view in section to a larger scale of part of the back 3 of the case 1 from FIG. 1 and shows one embodiment of the electronic module 14 that is adapted to be inserted permanently into the cavity 13 in the back.

In this embodiment, the module 14 comprises a base 15 made from an amagnetic and electrically insulative material. This material may be a plastic material such as high-density polyethylene or a ceramic material, for example, plastic materials being reserved for bottom of the range watches and middle of the range watches and ceramic materials for top of the range watches. In the latter case the ceramic material preferably has substantially the same colour and the same appearance as the metal that constitutes the back of the case, unless a particular aesthetic effect is required.

As shown in FIG. 2, the base 15 is cup-shaped and has a flat bottom 16 and an essentially cylindrical lateral wall 17. This figure also shows that the thickness of the wall 17 increases slightly and continuously from its base to its top so that its exterior surface 18 has a particular shape enabling it to co-operate with the internal wall 19 of the cavity 13, which has a complementary shape, to constitute a dovetail joint.

The external edge 20 of the wall 17 of the base and the rim 21 of the wall 19 of the cavity 13 are rounded to facilitate insertion of the module 14 into the cavity.

Figure 3:
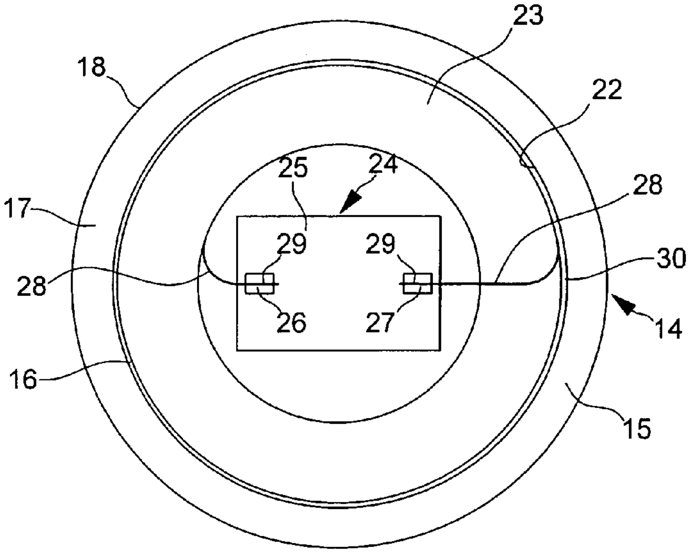
FIG. 3 is an incomplete plan view of the electronic module shown in FIG. 2, showing how the ends of the wire of its coil are connected to respective terminals of the integrated circuit of the module.

FIG. 3 is a plan view of the electronic module 14 from FIG. 2 without an adhesive filler material referred to hereinafter.

Referring to FIGS. 2 and 3, it can be seen that the lateral wall 17 of the base 15 has a truly cylindrical internal surface 22 which surrounds a flat and self-supporting annular coil 23, to be more precise a cylindrical coil. In the manner known in the art, the coil consists of a plurality of layers of contiguous and coaxial turns, not visible in the drawing, made from a very thin metal wire 28, preferably copper wire, covered with a sheath or an insulative and thermo-adhesive material that is partially melted by heating it so that all the portions of the sheath that surround the turns of wire are welded together when the coil is allowed to cool afterwards.

The coil 23 itself surrounds an integrated circuit 24 smaller than itself, of rectangular parallelepiped shape, and which has on its front face 25 two connecting terminals or "bumps" 26 and 27 to which the two ends 29 of the metal wire of the coil 23 are welded or fixed by means of a conductive adhesive.

The two connecting terminals 26 and 27 of the integrated circuit 24 shown in FIGS. 2 and 3 are disposed opposite each other in the lengthwise direction of the integrated circuit 24, but it is clear that they could be otherwise disposed on the front surface of the integrated circuit, for example side by side in its widthwise direction.

In this first embodiment, the coil 23 and the integrated circuit 24 are fixed directly to the internal face 30 of the flat bottom 16 of the base 15 by means of a thin layer of adhesive material 31 (see FIG. 2) and the space inside the coil left free by the integrated circuit is filled with an adhesive and insulative thermosetting material 32, for example an epoxy resin, to protect the ends 29 of the wire of the coil 23 and the means fixing them to the connecting terminals 26 and 27 before the module 14 is incorporated into the back of the watch case. The adhesive material 32 is preferably opaque so that it also protects the integrated circuit against light before it is incorporated into the back of the watch case.

The base 15 has or may have three functions.

Firstly, if the back 3 of the case 1 is made from a magnetic material, for example steel, this amagnetic material base serves as a screen between the back and the coil, to eliminate, if not totally, at least the majority of the magnetic flux losses in the back 3 when the coil sends and receives radio signals respectively to and from a reading and/or writing device to which it may be coupled.

Secondly, as shown in FIG. 2, the module 14 projects slightly from the external face 33 of the back 3 of the case 1 to form a boss 34 adapted to position it optimally and quickly on a head 35 of a reading and/or writing device shown partly and diagrammatically in dashed outline in FIG. 2 and which itself comprises an antenna 36 in the form of a coil. This head, which incorporates a recess 35' whose shape and dimensions correspond to those of the boss 34, may be connected via an interface to a device specifically designed to communicate with the memory of the watch, preferably a fixed or portable personal computer (PC).

Obviously, the boss 34 of the module would enable the watch to be placed in the same way on any support having a recess corresponding to the shape and dimensions of the boss.

If the module projects from the back of the case 1, its external edge 37 is preferably rounded to prevent the boss 34 causing discomfort to the wearer of the watch.

In all cases, it is clear that, because radio waves emitted and received by the coil 23 of the module 14 no longer have to pass through the whole of the thickness of the back 3 of the case 1 of the watch, but only that of the bottom 16 of the base of the module, which is much thinner, these radio waves will be much less attenuated and distorted than in prior art watches in which the electronic module is placed at the bottom but inside the case.

Until now, only one memory has been referred to in relation to the integrated circuit 24. It is nevertheless clear that this circuit could comprise a plurality of memories of different types, in particular memories for storing information that can only be read and other memories for storing other information that can also be deleted and/or modified or have additional information added to it.

This is the situation in the application example previously referred to in which the electronic module stores information relating to the watch itself, to be more precise its source, its purchaser and, just like a car, its "service record"; this information personalises the watch, which may be of benefit on selling the watch or facilitate the task of a watchmaker if the watch is passed to him for inspection or repair or simply for him to change the battery if the watch is of the electromechanical or electronic type.

In the case of middle of the range and top of the range watches, the stored information may be divided into the following four categories, for example:

1—"Brand" and model name or number under which the watch was sold, and where applicable a code specific to the brand, and a date on which and an address to which the watch was shipped to a retailer.

2—"Plant": name or sign of the company having manufactured the watch movement if this is not the same as the company selling the watch, and internal designation of the movement.

3—"Point of sale": retailer name and address, date of purchase and name of purchaser.

4—"Customer services": some or all of the above information, plus the date of and information on servicing carried out by the vendor or another retailer (for example adjustment, testing, battery replacement) and in the latter case the name and address of the other retailer.

Some of the above information may be stored in a ROM memory so that it can only be read. This applies to the "Brand" and "Plant" information referred to above.

The other information ("Point of sale", "Customer services") may be stored in one or more dynamic RAM, EPROM or EEPROM memory so that it can be deleted, modified or added to, if necessary.

The stored information depends also on the type of watch in whose case the electronic module is incorporated. For example, in the case of a bottom of the range watch whose case is of one-piece construction with a welded-on glass that prevents all possibility of working inside the watch, with the possible exception of changing the battery or having the battery changed if the watch is of the electromechanical or digital kind and under warranty, just the "Brand" and "Plant" information may be stored in read-only memory.

In all cases, the coil of a read head or of a support may be connected via an appropriate interface to a fixed or portable computer able to read the information contained in the memory or memories of the module and where applicable to delete, modify and add to some of that information.

This information may be sent to a protected Internet site or over an Intranet loop to which all persons involved with the watch have access.

Figure 4:
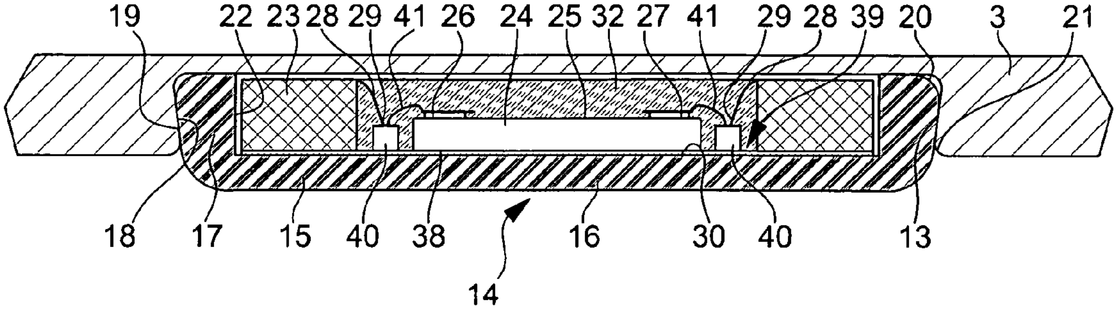
FIG. 4 is a view in section analogous to that of FIG. 2 of a second embodiment in which the ends of the wire of the coil of the electronic module are connected in a different way to the terminals of its integrated circuit.
Figure 5:
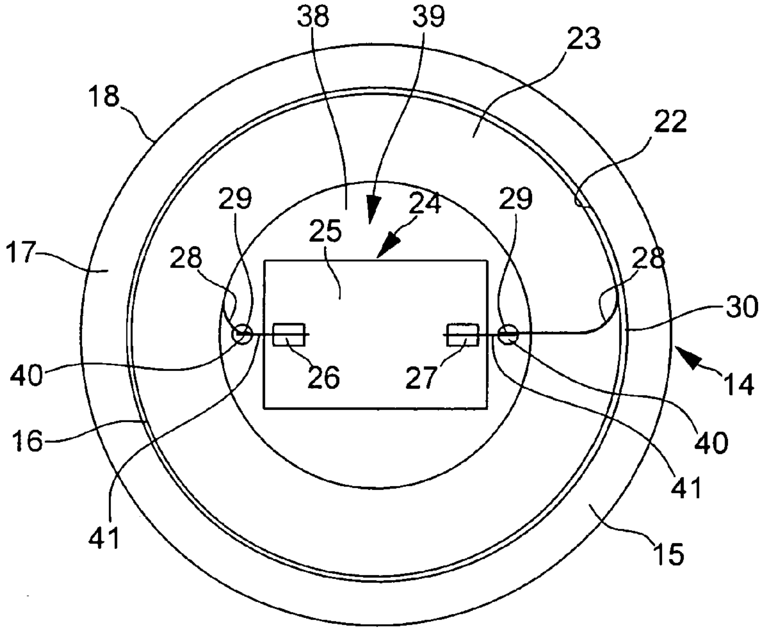
FIG. 5 is a view analogous to that of FIG. 3 for the FIG. 4 mode of connecting the integrated circuit and the coil.

FIGS. 4 and 5 are analogous to FIGS. 2 and 3 and show a second embodiment of the electronic module of a watch of the invention. In these figures, the same and corresponding components are designated by the same reference numbers, and only new components are indicated by new reference numbers.

One of the differences between the embodiment of FIGS. 4 and 5 and that of FIGS. 2 and 3 is that the coil 23 and the circuit 24 are no longer stuck directly to the internal face of the bottom 16 of the module 14, but instead to the substrate 38 of a printed circuit 39 which may itself be stuck to the bottom 16 of the base 15 of the module 14 or merely set into the base.

The other difference is that the ends of the wire 29 of the coil 23 no longer connect the coil to the terminals 26 and 27 of the integrated circuit 25 directly but instead via connecting lands 40 formed on the substrate 38 of the printed circuit 39. To be more precise, each end of the wire 29 is welded or stuck by means of an electrically conductive adhesive to one of the lands 40 which is in turn connected to a connecting terminal 26 or 27 of the integrated circuit 24 by a conductive wire 41.

Thanks to this the coil 23 and the integrated circuit 24 can be electrically connected using the standard automated wire bonding method.

Figure 6:
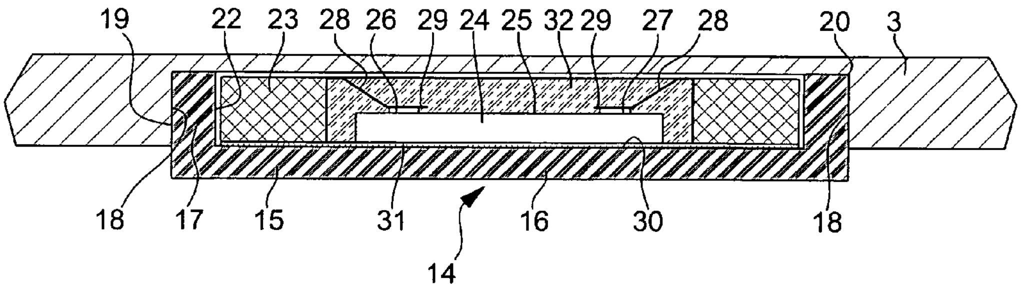
FIGS. 6 and 7 are views analogous to that of FIG. 2 showing other embodiments of electronic modules that can be incorporated into the back of a watch case of the invention.

In the embodiment shown in section in FIG. 6, the exterior surface 18 of the lateral wall 17 of the base 15 and the internal wall 19 of the cavity 13 in the back 3 of the watch case are both true cylinders and the module 14 is set into the cavity or adhesively bonded to the interior of the cavity. The external edge 21 of the wall 17 and that of the module 14 are not rounded as in the embodiment of FIGS. 2 and 3, but right-angled.

This embodiment is more suitable if the back 3 of the case and/or the base 15 of the module 14 are made from very hard materials that are difficult to machine or shape, such as certain ceramic materials or sapphire.

In this embodiment, as in that of FIGS. 2 and 3, the ends of the wire of the coil 23 are fixed directly to the connecting terminals 26 and 27 of the integrated circuit 24, but it is obvious that these ends of the wire and these terminals 26 and 27 could be connected in the same way as in the embodiment of FIGS. 4 and 5.

Note that in a different embodiment, not shown in the drawings, the module 14 could be crimped into the cavity 13 in the back 3 of the case. The base 15 of the module would then have on the same side as its bottom 16 an external peripheral cut-out in which an internal rim of the back 3 would engage. This method of fixing the module could be used if it were not possible to set it into the case or adhesively bond it to the case, for example.

Figure 7:
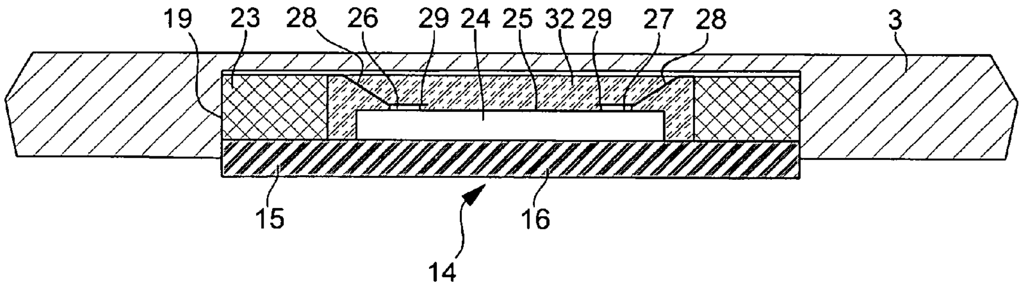

Unlike the FIG. 6 embodiment, which is reserved for top of the range watches, that shown in section in FIG. 7, which is much simpler and more economical, is very suitable for bottom of the range watches in which the back is made from a plastic material, for example.

In this case, the base 15 is reduced to a simple rigid plate of the same diameter as the outside diameter of the coil 23, and which may be made from the same material as the back of the case, in which eventuality the module 14 may be set into or adhesively bonded in the cavity 13 in the back of the case.

The above remarks as to the connection between the ends of the wire of the coil and the terminals of the integrated circuit are equally valid for this embodiment.

Clearly the invention is not limited to the embodiments or variants that have just been described or envisaged.

For example, instead of connecting the ends of the wire of the coil to the terminals of the integrated circuit by means of connecting lands using the wire bonding technique, this connection could be obtained using another well-known automated technique known as tape automated bonding (TAB), which is described in European Patent No. 0 376 062.

Although the method is described in that patent for producing electronic modules intended to be incorporated totally into electronic keys or cards, it is very suitable for producing modules to be fitted to watches of the invention.

In all the embodiments described or envisaged hereinabove, the back of the electronic module is proud of the exterior surface of the back of the case of the watch, but this is not obligatory.

In these embodiments and variants, the electronic module is fixed permanently into the cavity in the back of the case, but it would be entirely feasible to design a module with a base provided with a lateral wall enabling it to co-operate with an internal wall of the cavity in the back so as to render the module removable, and where applicable interchangeable, for example by means of a screwing or bayonet fixing system.

In this eventuality, it would obviously be necessary to provide means for extracting the module from the cavity in the back of the case and replacing the same module or substituting a replacement module. Those means could be a groove in the exterior face of the module, for example, like those provided for battery compartment covers in electromechanical or electronic watches.

Finally, another option would be to modify the characteristics of the antenna coil, in particular its diameter and the number of turns, to enable it to communicate with the antenna of a reading and/or writing device not at a distance of a few millimeters but at a distance of a few centimeters or tens of centimeters.

What is claimed is:

1. A watch comprising a case having a back, a movement contained in said case and an electronic module for storing information able to communicate by radio signals with a device for reading and/or writing said information, said module comprising a cup-shaped amagnetic material base, an integrated circuit having at least two connecting terminals and fixed to a flat bottom of said base and a send and receive antenna comprising a coil also fixed to to the flat bottom of said base and surrounded by a lateral wall of said base, the coil consisting of an electrically conductive wire having two ends connected to respective connecting terminals of said integrated circuit, said coil having an annular shape and surrounding a space in which said integrated circuit is placed, wherein said electronic module is housed at least for the most part in a cavity in the back of the case open towards the outside, and wherein the thickness of said lateral wall increases slightly and continuously from its base adjoining said flat bottom to its top so that it has an exterior surface co-operating with an internal wall of complementary shape of said cavity and constitutes a dovetail joint between said electronic module and the back of said case.

2. The watch according to claim 1, wherein said cavity and said module have an essentially cylindrical shape and are situated at the centre of the back of said case.

3. The watch according to claim 1, wherein the base of said module is set into, adhesively bonded in or crimped in said cavity.

4. The watch according to claim 1, wherein said base is made of a plastic material, a ceramic material or sapphire.

5. The watch according to claim 1, wherein said coil is a self-supporting coil that comprises a plurality of layers of contiguous and substantially coaxial turns that are formed by a thin metal wire surrounded by a sheath of electrically insulative material and connected together.

6. The watch according to claim 1, wherein said coil and said integrated circuit are adhesively bonded directly to said base and said ends of the wire of the coil are also fixed directly to said terminals of the integrated circuit by means of an electrically conductive material.

7. The watch according to claim 1, wherein said coil and said integrated circuit are fixed to the substrate of a printed circuit that has two connecting lands situated between said coil and said integrated circuit to which are fixed said ends of the wire of said coil and two ends of two conductive wires whose other ends are fixed to said connecting terminals of said integrated circuit.

8. The watch according to claim 1, wherein said module has a portion projecting out of the back of said case adapted to position it quickly and accurately on a head of said reading and/or writing device which itself comprises an antenna in the form of a coil and has a recess substantially the same shape and size as said boss.

* * * * *